(12) United States Patent
Scholz et al.

(10) Patent No.: US 10,921,533 B2
(45) Date of Patent: Feb. 16, 2021

(54) METHOD FOR COUPLING ELECTROMAGNETIC WAVES INTO A CHIP USING A CAVITY FOR A LIGHT SOURCE AND AN OPENING, FOR PASSAGE OF LIGHT OF THE LIGHT SOURCE, WHICH IS CONNECTED TO THE CAVITY

(71) Applicant: Robert Bosch GmbH, Stuttgart (DE)

(72) Inventors: Ulrike Scholz, Stuttgart (DE); Maximilian Amberger, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/552,681

(22) Filed: Aug. 27, 2019

(65) Prior Publication Data

US 2020/0073064 A1 Mar. 5, 2020

(30) Foreign Application Priority Data

Aug. 31, 2018 (DE) .............................. 102018214803

(51) Int. Cl.
*G02B 6/42* (2006.01)

(52) U.S. Cl.
CPC ......... *G02B 6/4219* (2013.01); *G02B 6/4204* (2013.01)

(58) Field of Classification Search
CPC .............................. G02B 6/4219; G02B 6/4204
USPC ........................................................... 385/33
See application file for complete search history.

(56) References Cited

U.S. PATENT DOCUMENTS

| | | | | |
|---|---|---|---|---|
| 4,380,365 A | * | 4/1983 | Gross | G02B 6/25 385/33 |
| 5,337,397 A | * | 8/1994 | Lebby | G02B 6/1221 385/33 |
| 6,069,905 A | | 5/2000 | Davis et al. | |
| 6,491,447 B2 | * | 12/2002 | Aihara | G02B 6/4214 385/89 |
| 6,771,686 B1 | * | 8/2004 | Ullman | G02B 27/09 372/34 |
| 9,310,571 B2 | * | 4/2016 | Hung | G02B 6/425 |
| 2005/0013552 A1 | * | 1/2005 | Chien | G02B 6/4237 385/88 |
| 2014/0169746 A1 | | 6/2014 | Hung | |
| 2016/0356971 A1 | * | 12/2016 | de Jong | G02B 6/4221 |

FOREIGN PATENT DOCUMENTS

EP 2061122 A1 5/2009

\* cited by examiner

*Primary Examiner* — Akm E Ullah
(74) *Attorney, Agent, or Firm* — Norton Rose Fulbright US LLP; Gerard Messina

(57) ABSTRACT

A device for coupling electromagnetic waves into a chip or the like, including a cavity for accommodating a light source, an opening for the passage of light of the light source, which is connected to the cavity, the device including a first surface and a second surface situated opposite the first surface, at least one of the two surfaces including at least two first surface sections, which are inclined relative to one another at an inclination angle, and the distance between the first surface and the second surface being different on different sides of the cavity and/or of the opening, and surface areas on different sides of the cavity and/or opening respectively adjacent thereto having the identical inclination angle.

7 Claims, 3 Drawing Sheets

METHOD FOR COUPLING ELECTROMAGNETIC WAVES INTO A CHIP USING A CAVITY FOR A LIGHT SOURCE AND AN OPENING, FOR PASSAGE OF LIGHT OF THE LIGHT SOURCE, WHICH IS CONNECTED TO THE CAVITY

RELATED APPLICATION INFORMATION

The present application claims priority to and the benefit of German patent application no. 10 2018 214 803.1, which was filed in Germany on Aug. 31, 2018, the disclosure of which is incorporated herein by reference.

FIELD OF THE INVENTION

The present invention relates to a device for coupling electromagnetic waves into a chip or the like. The present invention also relates to a method for manufacturing a device for coupling electromagnetic waves into a chip or the like.

BACKGROUND INFORMATION

It is believed to have become understood to couple light into a chip via optical waveguides, whereby in this case either a so-called edge coupling, i.e., a coupling of light at the chip edge or a so-called grating coupling, i.e., a coupling on grating couplers from above onto the chip surface may be used. In the case of edge coupling, a high positioning accuracy must be maintained in order to transmit the maximum light output into a photonic integrated circuit, in short, PIC for photonic integrated circuit. In the case of grating coupling, the optical waveguides, in addition to their lateral positioning, must be aligned on the chip at a particular angle to the chip surface, for example, 8° from the normal, an active alignment procedure being used here in the process.

Edge emitters or vertical emitters, VCSEL, may be used in an understood manner as light sources for the light.

To couple light into grating couplers, it has become known to use a so-called optical bench. The optical bench is made up of a silicon intermediate element, on which an edge emitter, a lens and spherical lens for deflecting the beam path of the light are situated. This optical bench may be positioned on the PIC and contacted with the aid of wire bonds in such a way that the light is directed onto the grating coupler and coupled there into the PIC. In the case of an edge coupling, an edge emitter is used which, together with at least one lens, is situated precisely relative to the chip edge of the PIC.

SUMMARY OF THE INVENTION

In one specific embodiment, the present invention provides a device for coupling electromagnetic waves into a chip or the like, including a cavity for accommodating a light source, an opening for the passage of light of the light source, which is connected to the cavity, the device including a first surface and a second surface located opposite the first surface, at least one of the two surfaces including at least two first surface sections inclined relative to one another at an inclination angle, and the distance between the first surface and the second surface being different on different sides of the cavity and/or the opening and surface areas on different sides of the cavity and/or opening respectively adjacent thereto having identical inclination angles.

In another specific embodiment, the present invention provides a method for manufacturing a device for coupling electromagnetic waves into a chip, including the steps manufacturing a cavity in the device for accommodating a light source, manufacturing an opening for the passage of light, which is connected to the cavity, manufacturing a first surface and a second surface situated opposite the first surface to include at least two first surface sections, which are inclined relative to one another at an inclination angle, and including a different distance between the first surface and the second surface on different sides of the cavity and/or of the opening and surface areas on different sides of the cavity and/or opening respectively adjacent thereto being manufactured with identical inclination angles.

In another specific embodiment, the present invention provides a chip, including a device according to the descriptions disclosed herein.

One of the advantages achieved thereby is that a compact and cost-efficient coupling device may be provided, which enables an efficient coupling of the light into a photonic integrated circuit. Another advantage is that a high throughput speed may be achieved during the manufacture of the device. It is also an advantage that a simple assembly and, in particular, a manufacture suitable for series production are enabled.

In other words, an essentially wedge-shaped device having two planes is provided, which are situated at a well-defined angle relative to one another. In this configuration, the first plane may be used for handling the device and for mounting the light source. The second plane may be used to ensure the required angle of the incident light on a chip during the assembly.

Additional features, advantages and additional specific embodiments of the present invention are described below or become apparent as a result.

According to one advantageous refinement, the two adjacent surface areas form a shared plane. In this way, it is possible to provide a flat contact surface on both sides of the cavity and/or of the opening.

According to another advantageous refinement, the device is manufactured from ceramic, from a glass material, from silicon and/or from a polymer. This allows for a simple manufacturing in a particularly flexible manner, which may be adapted to the desired accuracy of the coupling of light and of the fixing of the device on the respective chip or the like.

According to another advantageous refinement, the device includes at least one electrical contact for the electrical contacting of the light source. In this way, a light source situated in the cavity may be electrically contacted in a simple manner.

According to another advantageous refinement, the device includes a beam shaping element. In this way, a light beam of a light source situated in the cavity may be effectively coupled into a photonic integrated circuit with the aid of the device.

According to another advantageous refinement, the beam shaping element is situated in a recess. Thus, a simple arrangement of the beam shaping element in the device is possible.

According to another advantageous refinement, the recess is connected to the opening. In this way, it is possible for a light beam to enter from the cavity via the opening directly into the recess, in which, for example, a beam shaping element for influencing the shape of the light beam of a light source situated in the cavity is situated.

According to another advantageous refinement, the beam shaping element is configured as a lens. This allows for a simple and cost-efficient beam shaping element.

According to another advantageous refinement of the method, the device is manufactured with the aid of a molding method and/or of a writing method, in particular, photon lithography. This allows for a flexible and simultaneously cost-efficient manufacturing of the device.

According to another advantageous refinement of the method, a recess is produced, which is connected to the opening, and a beam forming element being situated in the recess with the aid of adhesive bonding or of a component shaping method, in particular, with the aid of ablation, injection molding, printing and/or lithography. Thus, a beam shaping element may be provided in a flexible manner depending on predefinable conditions and in a simple and simultaneously cost-efficient manner.

Additional important features and advantages of the present invention result from the subclaims, from the drawings and from the associated figure description with reference to the drawings.

It is understood that the features mentioned above and those to be explained below are usable not only in the respectively indicated combination, but also in other combinations or alone, without departing from the scope of the present invention.

Exemplary embodiments and specific embodiments of the present invention are depicted in the drawings and are explained in greater detail in the following description, identical reference numerals relating to identical or similar or functionally identical components or elements.

DETAILED DESCRIPTION

Figure 1:
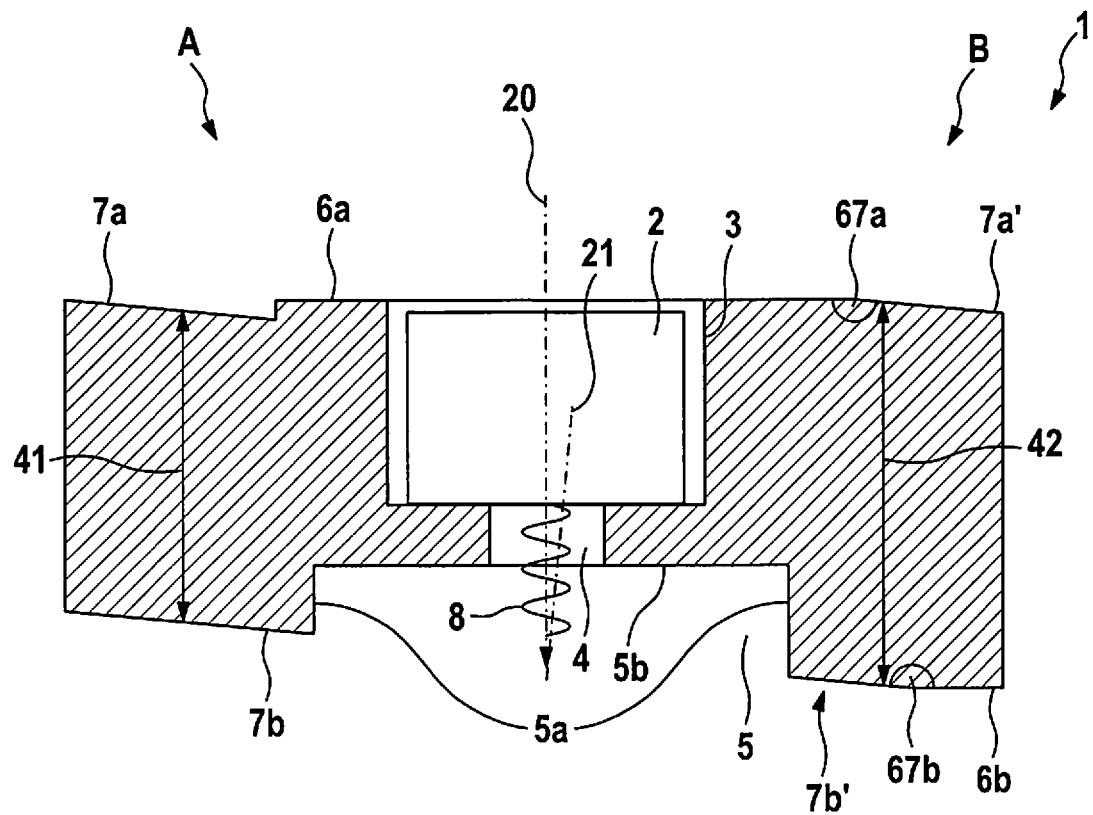
FIG. 1 shows schematically and in cross section a device according to one specific embodiment of the present invention.

FIG. 1 schematically and in cross section shows a device according to one specific embodiment of the present invention.

A device 1 for coupling electromagnetic waves into a chip is shown in detail in FIG. 1. Device 1 has an essentially rectangular cross sectional configuration and includes a light source 2 situated in a cavity 3, which is able to radiate light 8 via an opening 4 into a recess 5. In this configuration, cavity 3 is situated in the upper area, recess 5 is situated in the lower area of device 1. Recess 5, opening 4 and cavity 3 have essentially a rectangular cross sectional configuration, but may also have a circular configuration or the like not depicted here. The upper surface of device 1 in this case has the following profile from left to right: situated on left side A of cavity 3 is a surface area 7a sloping downward from left to right, which transitions upwardly via a vertical offset into a horizontal area 6a. Cavity 3 is situated in this area 6a. Optical axis 20 of cavity 3 in this configuration is situated perpendicularly to this surface area 6a. Surface area 6a extends further from left to right on right side B of cavity 3 and then transitions into a second surface area 7a' sloping downward from left to right in parallel to first surface area 7a at an angle 67a.

The underside of device 1 has a surface, the profile of which from left to right in FIG. 1 is as follows: a surface area 7b formed in a subarea in parallel to first surface area 7a extends from left to right on left side A of cavity 3 or recess 5, the profile of which is interrupted in the area of opening 4 below cavity 3 by the essentially rectangular-shaped recess 5. Recess 5 has an essentially cross sectional U-shaped configuration and has two vertical edge areas 5a to the left and right, the profile of which extends in parallel to the vertical edge areas of cavity 3 and opening 4. A surface 5b of recess 5 is aligned in parallel to plane 6a, 6b. In this case, it is equally possible for one or multiple gradations to be formed in recess 5 or for these to be funnel-shaped.

Situated on right side B of cavity 3 or of opening 4 is an area 7b', which represents essentially an extension of area 7b beyond recess 5. This area is then tilted at an angle 67b and transitions into a surface area 6b, which is situated and extends in parallel to surface area 6a on the upper side of device 1. Thus, the two areas 7b, 7b' essentially form a plane. In this configuration, the vertical extension on left side A of device 1 between the two areas 7a, 7b identified with reference numeral 41, is shorter than the vertical extension on right side B of device 1, identified with reference numeral 42. Light source 2 is further configured as a vertical emitter VCSEL. Once device 1 is assembled, axis 21 of light 8 striking a photonic integrated circuit 9 is inclined with respect to optical axis 20 of cavity 3 and of opening 4.

Figure 2:
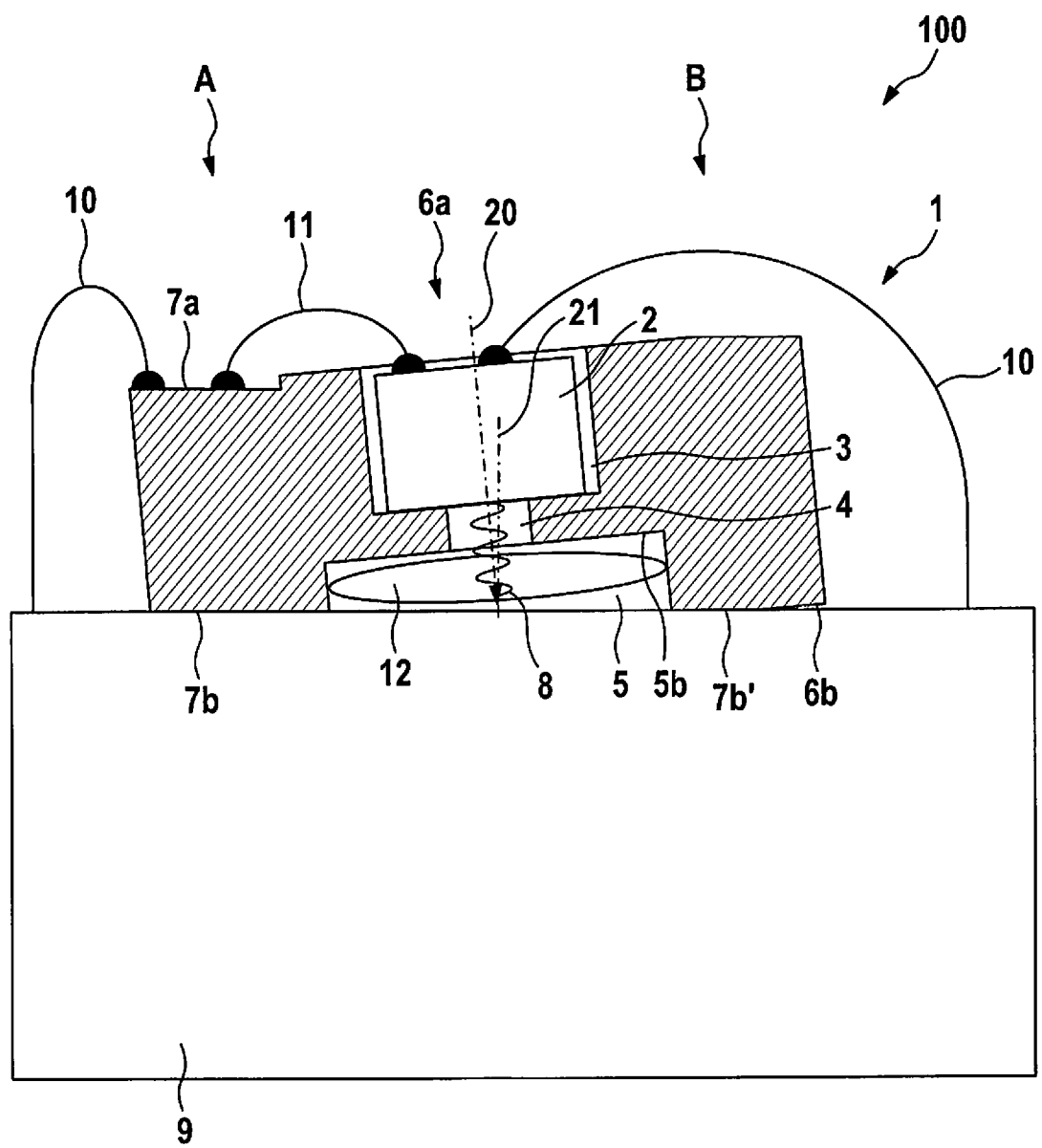
FIG. 2 shows schematically and in cross section a chip, including a device according to one specific embodiment of the present invention.

FIG. 2 shows a chip, including a device according to one specific embodiment of the present invention.

A chip 100 is shown in detail in FIG. 2. The chip includes a photonic integrated circuit 9 on which device 1 according to FIG. 1 is situated. In contrast to device 1 according to FIG. 1, a lens 12 is situated in recess 5 in device 1 according to FIG. 2. Device 1 in this case is situated with the two areas 7b, 7b' each on the left or right side A, B of device 1 on the upper surface of photonic integrated circuit 9. Device 1, more precisely, light source 2, is also connected via electrical contacts 10 to photonic integrated circuit 9 for electrical contacting and, if necessary, is contacted via additional electrical contacts 11 on the surface of device 1.

Device 1 in this case is manufactured from a freely shapeable material, for example, device 1 is manufactured from ceramic or from a glass material, which is manufactured in a molding method or a writing method in the beneficial composite.

As an alternative, device 1 may also be manufactured from silicon, for example, with the aid of laser material processing, or also from a molded polymer.

A plane or planes parallel to this plane provide the possibility of handling chips and separated device 1 as in the previously known chip assembly, i.e., they represent the boundary conditions for standard assembly processes suitable for series production. Other plane 7b, 7b' inclined at a particular angle relative to the first plane, which is situated, in particular, opposite thereto, sets the exact angle for the coupling of light 8.

It is further conceivable to also situate one or multiple metallic structures, in order to also electrically contact light source 2, in particular, in the form of a laser chip. These may be applied using a printing method or a writing method.

Furthermore—as shown in FIG. 2—a lens 12 for shaping the beam path of light source 2 may also be situated in recess 5. Lens 12 may be adhesively secured during the manufacture of device 1 from ceramic or silicon, when manufacturing device 1 from glass or plastic, lens 12 may also be produced using the component shaping method, in particular, ablation, injection molding, molding, printing or the like or subsequently adhesively bonded. Device 1 is used, for example, in the assembly of laser chip to wafer or laser chip to PIC 9.

As previously explained, plane 7b, 7b' serves as a deposit surface, mounting surface or contact surface for handling device 1. The devices are initially present in a beneficial composite and rest on the workpiece carrier aligned to plane 6a, 6b, for example, for assembling the VCSELs. A surface 5b of recess 5 in this case is aligned in parallel to plane 6a, 6b.

Once the VCSELs 2 are assembled, devices 1 are isolated, for example, with the aid of sawing or with the aid of a laser separation method. Once isolated, the handling of device 1 takes place on second plane pair 7a, 7a', 7b, 7b', which ensures the correct angular setting of light beam 8 onto PIC 9.

Device 1 may be adhesively bonded or soldered to PIC 9. Electrical contacts 10, 11 are subsequently wire-bonded, gold wire being bonded either directly from VCSEL 2 onto PIC 9 using a thermosonic method, i.e., device 1 includes no electrical structures, or gold wire bond 11 may be bonded from VCSEL 2 onto device 1 and from device 1 onto PIC 9. Alternatively, bonding may also take place from VCSEL 2 directly to a laser driver, for example, in the form of a CMOS chip. The thermosonic gold-bonding or copper wire-bonding is advantageously used, since the bonding of the ball bonds with respect to inclinations is robust.

Figure 3:
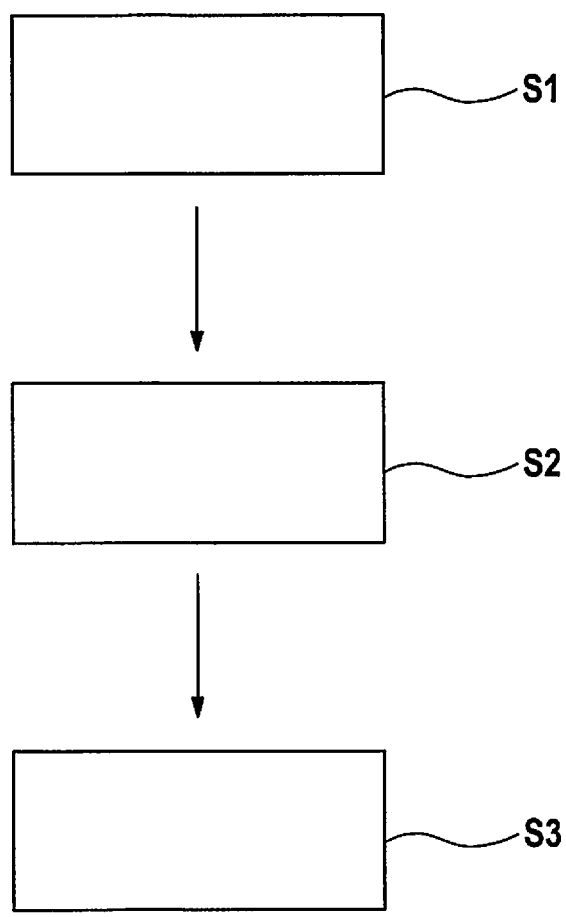
FIG. 3 shows schematically and in cross section tasks/steps of a method according to one specific embodiment of the present invention.

FIG. 3 shows steps of a method according to one specific embodiment of the present invention.

FIG. 3 shows a method for manufacturing a device for coupling electromagnetic waves into a chip.

In a first step S1, a cavity is manufactured in the device for accommodating a light source.

In a second step S2, an opening for the passage of light, which is connected to the cavity, is also manufactured.

In a third step S3, a first surface and a second surface opposite the first surface are also manufactured, at least one of the two surfaces being manufactured having at least two first surface sections, which are inclined relative to one another at an inclination angle and with a different distance between the first surface and the second surface on different sides of the cavity and/or of the opening, and surface areas on different sides of the cavity and/or opening respectively adjacent thereto being manufactured with identical inclination angles.

In summary, at least one of the specific embodiments of the present invention includes at least one of the following advantages:
simple manufacture
cost-efficient manufacture
easy handling of the device
efficient coupling of light possible
manufacture suitable for series production The present invention, although described with reference to the exemplary embodiments, it not limited to these, but is modifiable in a variety of ways.

What is claimed is:

1. A device for coupling electromagnetic waves into a chip, comprising:
   a cavity for accommodating a light source, and an opening for passage of light of the light source, which is connected to the cavity;
   a first surface;
   a second surface situated opposite the first surface, at least one of the first and second surfaces having at least two first surface sections, which are inclined relative to one another at an inclination angle and the distance between the first surface and the second surface being different on different sides of the cavity and/or opening and surface areas on different sides of the cavity and/or opening respectively adjacent thereto having the identical inclination angle; and
   a recess for accommodating a lens and having a cross sectional U-shaped configuration, wherein the recess is adjacent to the opening, wherein the light passes through the opening and into and through the recess;
   wherein the two adjacent surface areas having the identical inclination angle form a shared plane, and
   wherein an axis of the light striking the chip is inclined with respect to an optical axis of the cavity and of the opening.

2. The device of claim 1, wherein the device is manufactured from ceramic, from a glass material, from silicon and/or from a polymer.

3. The device of claim 1, wherein the device includes at least one electrical contact for electrically contacting the light source.

4. The device of claim 1, wherein the device includes a beam shaping element.

5. The device of claim 4, wherein the beam shaping element is situated in a recess.

6. The device of claim 5, wherein the recess is connected to the opening.

7. The device of claim 6, wherein the beam shaping element includes a lens.

\* \* \* \* \*